United States Patent [19]
Parmar et al.

[11] Patent Number: 5,309,767
[45] Date of Patent: May 10, 1994

[54] PRESSURE SENSOR USING LIQUID CRYSTALS

[75] Inventors: Devendra S. Parmar, Hampton; Harlan K. Holmes, Newport News, both of Va.

[73] Assignee: Center for Innovative Technology, Herndon, Va.

[21] Appl. No.: 959,931

[22] Filed: Oct. 9, 1992

[51] Int. Cl.$^5$ .................................................. G01L 9/00
[52] U.S. Cl. ........................................ 73/705; 73/800; 73/723; 250/225; 250/231.19
[58] Field of Search ................ 250/231.1, 225, 231.19; 359/46; 73/705, 800, 723

[56] References Cited

U.S. PATENT DOCUMENTS

| | | | |
|---|---|---|---|
| 4,777,358 | 10/1988 | Nelson | 250/225 |
| 4,837,777 | 6/1989 | Jones et al. | 73/705 X |
| 5,128,535 | 7/1992 | Bock et al. | 250/231.19 X |

Primary Examiner—Donald O. Woodiel
Assistant Examiner—Joseph L. Felber
Attorney, Agent, or Firm—Whitham & Marhoefer

[57] ABSTRACT

A pressure sensor includes a liquid crystal positioned between transparent, electrically conductive films (18 and 20), that are biased by a voltage (V) which induces an electric field (E) that causes the liquid crystal to assume a first state of orientation. Application of pressure (P) to a flexible, transparent film (24) causes the conductive film (20) to move closer to or farther from the conductive film (18), thereby causing a change in the electric field (E'(P)) which causes the liquid crystal to assume a second state of orientation. Polarized light ($P_1$) is directed into the liquid crystal and transmitted or reflected to an analyzer (A or 30). Changes in the state of orientation of the liquid crystal induced by applied pressure (P) result in a different light intensity being detected at the analyzer (A or 30) as a function of the applied pressure (P). In particular embodiments, the liquid crystal is present as droplets (10) in a polymer matrix (12) or in cells (14) in a polymeric or dielectric grid (16) material in the form of a layer (13) between the electrically conductive films (18 and 20). The liquid crystal fills the open wells in the polymer matrix (12) or grid (16) only partially.

15 Claims, 3 Drawing Sheets

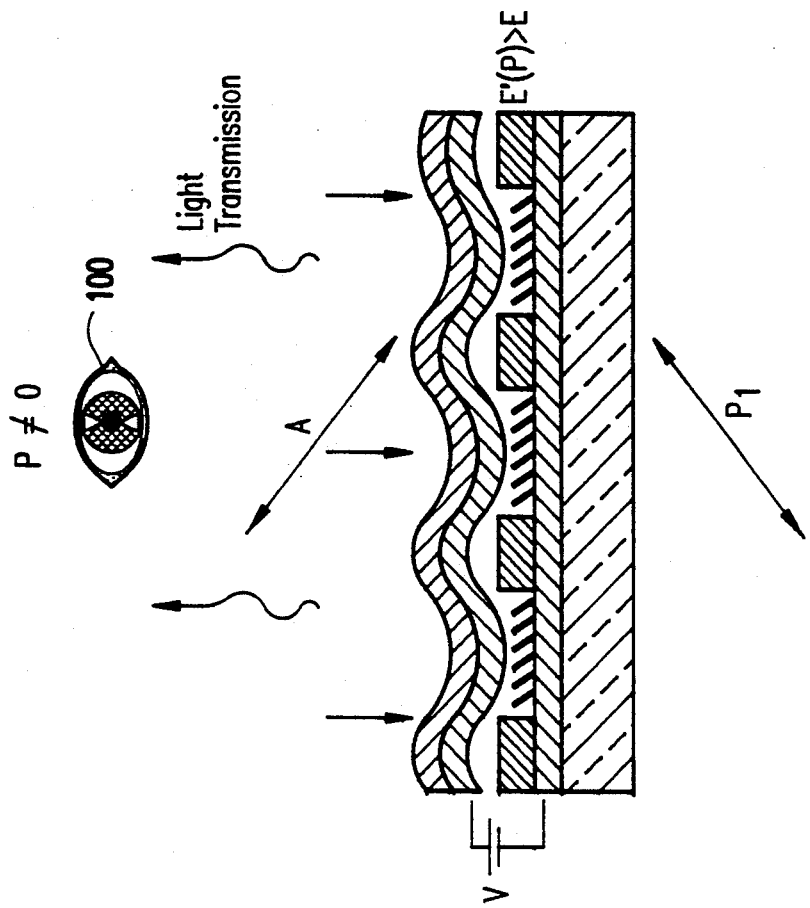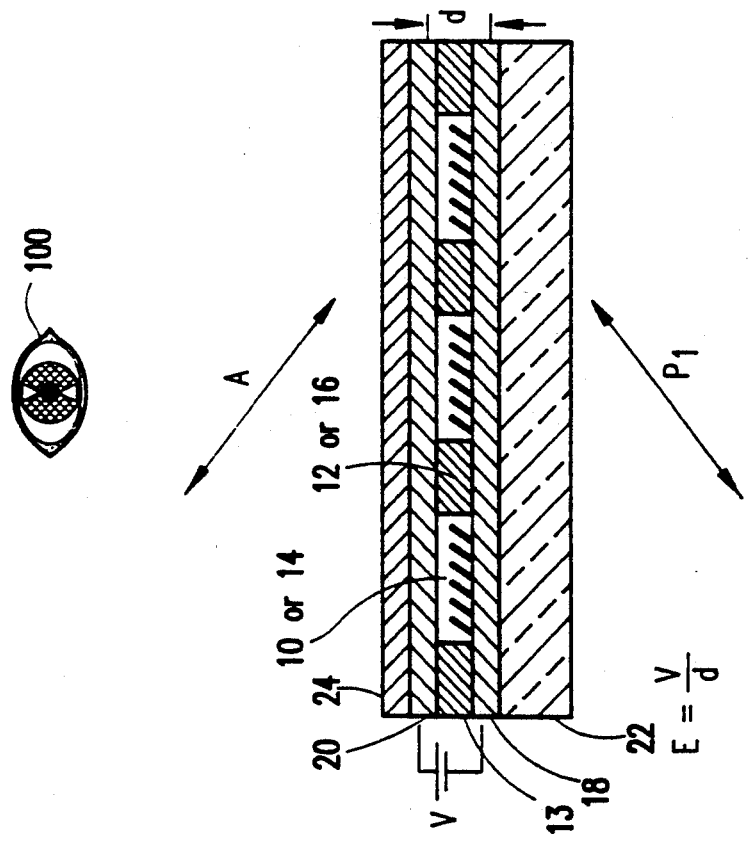

PRESSURE SENSOR USING LIQUID CRYSTALS

"This invention was made with government support under Contract NAS1-18584 awarded by NASA. The government has certain rights in this invention."

BACKGROUND OF THE INVENTION

1. Field of the Invention

The invention is generally related to pressure sensors and, more particularly, to a new kind of pressure sensor which utilizes a combination of an electric component that includes spaced apart conductive films with a liquid crystal therebetween and an optical component which includes a polarized light transmission scheme that operates in conjunction with the liquid crystal.

2. Description of the Prior Art

Pressure is defined as force per unit area. Precise knowledge of the pressure on a system is required in a number of situations. For example, in any system which involves fluid-dynamics (e.g., oil rigs, air conditioning equipment, etc.), monitoring and control of differential pressure is essential. Pressure is one of the fundamental terms in the ideal gas law and its corollaries and is one of the determining factors in vapor-liquid equilibria. In semiconductor manufacturing, many fabrication processes are performed under vacuum pressure (e.g., plasma etching, etc.) and knowledge and control of the pressure in these processes is absolutely required. Pressure often plays an important role in the safety and performance of a system or element (e.g., point of failure, etc.).

Over the years, many different sensors have been devised for measuring pressure. For example, diaphragm elements have been used as pressure sensors wherein a thin flexible disk is connected to an indicator pointer, recorder pen, or other element. Deflection of the diaphragm due to pressure from an impinging fluid or other source causes the indicator pointer, recorder pen, or other element to move on scale which is related to pressure. Diaphragm capsules are used in a similar pressure measurement scheme and include two or more circular diaphragms welded at the edges. An inverted bell pressure sensing device includes two inverted bells in an oil bath suspended on opposite ends of a balance beam. Movement of the balance beam due to different pressures under the two bells is coupled to an attached pointer or other indicating device which is scaled to correlate with pressure. A Bourdon tube pressure sensor includes a tube with a sealed end and an open end which is connected to a fluid pressure source. The tube is typically spiral shaped, helix shaped or a C-type. Rotating motion of the tube under the operating pressure actuates a pointer or other indicator that corresponds with a pressure scale. Piezoresistive transducers convert a change in pressure into a change in resistance. These type of pressure sensors are typically silicon wafers or chips with embedded resistors. Strain on the embedded resistor caused by a source of pressure on the silicon substrate results in a linear change in resistance that is measured and converted to pressure units. Piezoelectric pressure sensing devices are based on the principle that quartz, when properly cut and oriented with respect to its crystallographic axes, generates a small electric charge on certain surfaces when stressed. In practice, a stack of piezoelectric elements are coupled to a diaphragm element, such that deflection of the diaphragm under the influence of a pressure source results in a compressive force on the quartz stack which, in turn, generates a charge proportional to the stack.

The quantitative measurement of local and global pressure on a surface is important in many applications. For example, local and global pressure measurements are particularly required in a flow field on the walls of an object in aerodynamic testing. Conventional techniques of pressure measurement in such applications generally fall in two categories. First, pressure measurements can be performed where calibration of the device is independent of the flow. Second, pressure measurements can be performed where calibration of the device in terms of the law of the wall is necessary. Pressure sensors utilizing capacitance gauges, magnin wires, etc., can be calibrated against dead weights, and are exemplary of the first category of pressure measurement. Pressure scanners and Preston tubes rely on the basic Newtonian relations and thus produce results which are unreliable and difficult to interpret in a disturbed and/or under dynamic boundary layer conditions. Pressure sensitive paints, apart from having slow response controlled by diffusion times (on the order of a few seconds), suffer similarly from the requirement of an oxygen environment which is undesirable in some working situations and also have repeatability problems. Moreover, for local pressure measurements, there are practical limitations in microsizing most available sensors. Also, when sensors need to be mounted within the body of the surface being monitored, there are limitations on the area of measurements. In view of this, there is a clear need for development of pressure sensors capable of measuring local as well as global pressures on a continuous basis which are easy to mount and cost effective.

SUMMARY OF THE INVENTION

It is an object of this invention to provide a new type of pressure sensor.

It is another object of this invention to provide a pressure sensor that has sensitivity over any surface contour.

It is another object of this invention to provide a dynamic or fast acting pressure sensor that responds immediately to input pressure fluctuations.

It is yet another object of this invention to provide a pressure sensor that functions independent from the gas composition of the test environment.

A pressure sensor according to this invention includes both electric and an optical components. The electric component comprises a liquid crystal positioned between two spaced apart, electrically conductive films. The films are electrically biased to re-orient the liquid crystal molecular long axes. The arrangement is similar to a capacitor where the liquid crystal serves as the dielectric. At least one of the electrically conductive films would be transparent and at least one of the electrically conductive films would be capable of flexing towards the other film under an applied pressure. The optical component includes a means for directing polarized light into the liquid crystal and a means for detecting the polarized light which emanates from the liquid crystal.

In operation, the liquid crystal would assume a first state of orientation under the influence of the electrical bias applied to the conductive films. Polarized light would be directed into the liquid crystal and polarized light emanating from the liquid crystal would be detected. A source of pressure applied to one of the conductive films will cause the film to flex closer to the opposing conductive film, or move away from the opposing conductive film in the case of a vacuum pressure. As the distance between the conductive films changes under the influence of the applied pressure, the electric field between the films changes. The change in the electric field results in the liquid crystal between the films assuming a second state of orientation. The intensity of the polarized light which is transmitted through the liquid crystal is a function of the orientation state of the liquid crystal. Hence, the pressure applied to the film is sensed by monitoring changes in the intensity of the transmitted polarized light from the liquid crystal.

In a preferred embodiment, the polarized light sensor or analyzer is set to receive polarized light 90° out of phase from the polarized light which is directed towards the liquid crystal. In this way, when the liquid crystal assumes the first orientation state under the applied bias, no light passes through the analyzer. Upon application of a source of pressure, the orientation state of the liquid crystal changes, thereby allowing some light to pass through the analyzer. The amount of light passed will be a function of the degree to which the orientation state of the liquid crystal changes, which, in turn, changes the degree of polarization of the light transmitted through the sensor. In this situation, the transmitted light through the sensor is no longer 90° out of phase with the analyzer.

Polarization filters can be used to produce the polarized light directed at the liquid crystal and to filter the light emanating from the liquid crystal.

The pressure sensor according to this arrangement is dynamic acting. That is, the pressure sensor is capable of fast response to changes in the input pressure fluctuations as opposed to being limited to diffusion times or long tube lengths. The pressure sensor functions independent from the gas in the test environment, unlike other sensors which require a specific gas in order to be functional.

A particularly important feature of this invention is that the pressure distribution over a large area can be assessed quickly. In the past, discrete measurements at particular points or arrays of points distributed over the area to be monitored were required for analyzing the pressure distribution. With the present pressure sensor, local pressures result in changes in the electric field at those locations where pressure is exerted on the sensor. Hence, the pressure distribution is assessed by monitoring the intensity of polarized light emanating from all regions of the pressure sensor. In addition, the present pressure sensor need not be flat, but can fit over contoured surfaces. Therefore, the pressure distribution over shaped articles such as aircraft wings and the like can be assessed with the present pressure sensor.

BRIEF DESCRIPTION OF THE DRAWINGS

The foregoing and other objects, aspects and advantages will be better understood from the following detailed description of a preferred embodiment of the invention with reference to the drawings, in which:

FIGS. 3a and 3b are cross-sectional side views of a pressure sensor according to this invention which illustrate the operation of the pressure sensor;

DETAILED DESCRIPTION OF THE PREFERRED EMBODIMENTS OF THE INVENTION

Liquid crystals are highly anisotropic fluids that appear between the solid and the isotropic fluid phases of matter. The phase is a result of long-range orientational ordering among constituent molecules that occurs within certain temperature ranges in melts and solutions of many organic compounds with long molecules. The ordering is sufficient to impart some solidlike properties to this intermediate fluid, but the forces of attraction among the molecules are usually not strong enough to prevent flow. Liquid crystallinity is also referred to as mesomorphism. Many thousand organic substances and some polymers exhibit liquid crystallinity. The most common molecular feature among liquid crystals is an elongated, narrow molecular framework, which usually is depicted as a rod or cigar shaped entity. More recently, liquid crystallinity has also been observed in materials with disc shaped molecules. Such liquid crystals are also called "discotics". Examples of liquid crystals which might be employed within the practice of this invention include Nematic liquid crystals (e.g., p-methoxybenzylidene-p'-n'-butylaniline (MBBA), p-n-hexyl-p'-cyanobiphenyl, and p-azoxyanisole (PAA)), Cholesteric or spontaneously twisted nematic liquid crystals (e.g., cholesteryl nonanoate and (−)-2-methylbutyl-p-(p'-methoxybenzylideneamino)cinnamate), smectic liquid crystals (e.g., p-n-octyloxybenzoic acid and ethyl p-ethoxybenzal-p'-aminocinnamate), and Ferroelectric liquid crystals (e.g., p-decyloxybenzilidene-p'-amino-2-methylbutylcinnamate). Ferroelectric liquid crystals have been found to be particularly advantageous in the pressure sensor application contemplated by this invention.

Figure 2:
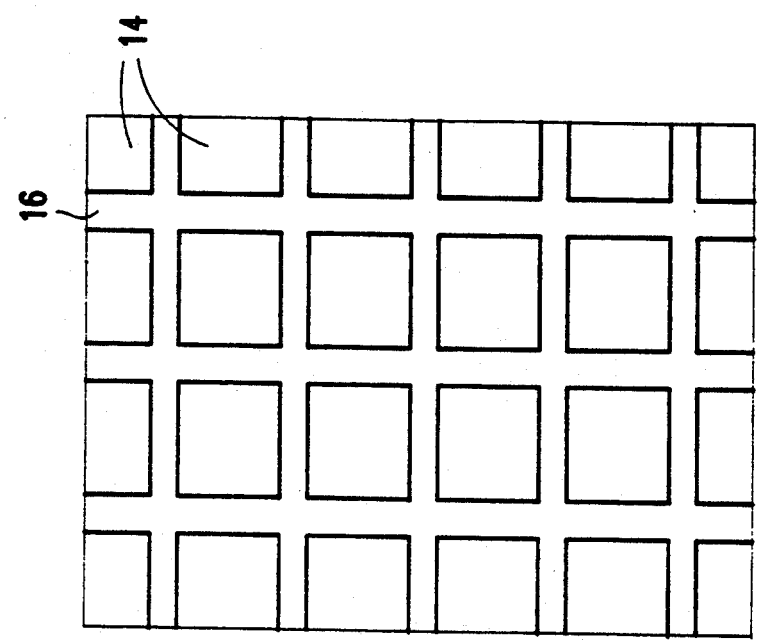
FIG. 2 is a top view of a grid with liquid crystal positioned within each cell of the grid.
Figure 1:
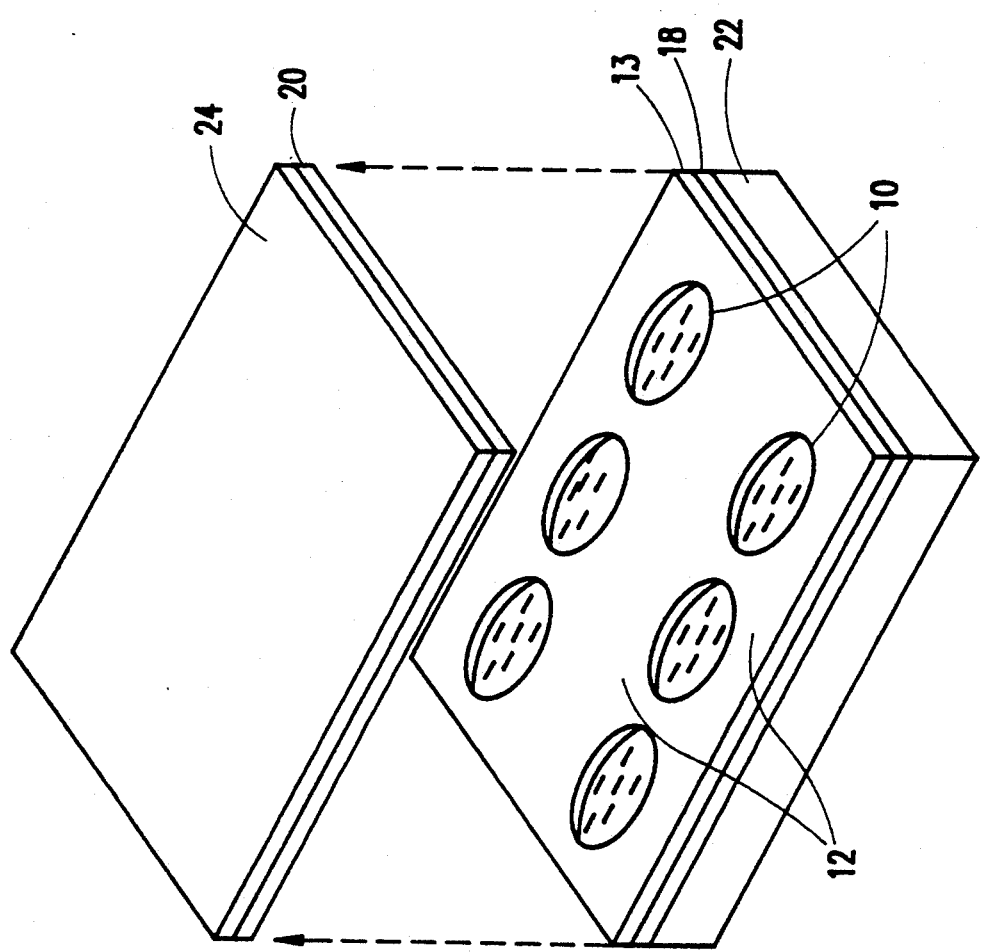
FIG. 1 is an isometric view of a polymer dispersed liquid crystal positioned between two transparent, indium-tin-oxide (ITO) films.

FIGS. 1 and 2 show alternative arrangements wherein liquid crystals will be sandwiched between electrically conductive layers to create a capacitive element which is used for measuring pressure.

FIG. 1 particularly shows droplets 10 of liquid crystals formed in a polymer matrix 12. The layer 13 resembles a slice of swiss cheese. Formation of layer 13 is achieved by creating a dispersion of liquid crystals and polymeric material or polymer forming agents within a suitable solvent. The dispersion is then spread across a substrate to form a layer 13 which is on the order of micrometers thick. Phase separation of the liquid crystals and polymeric material or polymer forcing agents can be induced by polymerization, thermal quenching, or solvent evaporation. After phase separation, a very thin layer 13 is formed in which microsize (e.g., 0.1-10 μm) droplets 10 are surrounded by the polymer matrix 12 from all sides. The top of the liquid crystal droplets 10 is exposed and is lower in height than the surrounding polymer matrix 12. Controlling the mass ratio of the liquid crystal/polymer material mixture allows the overall thickness of layer 13 and the droplet 10 size and distribution within the matrix 12 to be adjusted. An exemplary dispersion includes a 1:1 ratio of a liquid crystal (e.g., ZLT 3654 available from EM Industries) and a polymer (e.g., methylmethacrylate) dissolved in a suitable solvent (e.g., chloroform).

FIG. 2 shows liquid crystals positioned within cells 14 of a grid 16. The grid 16 can be a polymeric or elastomeric material such as a polyimide or rubber compound, or a dielectric material like silicon monoxide. The grid 16 can be fabricated by applying the compound onto a substrate in the proper pattern by spraying, painting, dipping, or other means such as photolithographic etching, etc. Preferably the cells 14 and the thickness of the layer which includes the grid 16 and liquid crystals are very small (e.g., micron sized like the droplets 12 in FIG. 1). The grid 16 with liquid crystal cells 14 is an alternative to layer 13 in FIG. 1. As in FIG. 1, the top of the liquid crystals in the cells 14 will be lower in height than the grid 16.

With particular reference to FIG. 1, the layer 13 is sandwiched between two transparent, electrically conductive films 18 and 20. Indium-tin-oxide would be ideal for films 18 and 20; however, other electrically conductive films which are transparent should also be suitable (e.g., tin-oxide, etc.). The films 18 and 20 are preferably on the order of a few microns thick and can be created using conventional thin film coating equipment. In FIG. 1, film 18 is coated on a glass substrate 22 and film 20 is coated on a thin, flexible, transparent material 24. For example, polyvinylidine fluoride film or mylar would be suitable as material 24.

In the practice of this invention, at least one of the electrically conductive films 18 or 20 must be able to move with respect to the other film under the influence of an applied pressure. In FIG. 1, pressures applied to film 24 will move electrically conductive film 20 towards or away from electrically conductive film 18 at the locations of the liquid crystal droplets 10 or the liquid crystal cells 14 depending on the nature of layer 13.

FIGS. 3a and 3b demonstrate the operation of the pressure sensor according to this invention. The liquid crystals in the droplets 10 or cells 14 are subjected to an electrical field, E, by biasing the electrically conductive films 18 and 20 with a voltage, V. The electrical field, E, is a function of the voltage, V, and the distance, d, between the films 18 and 20. The electrical field, E, causes the liquid crystals to assume a first state of orientation in which the molecular long axes (the director) are oriented in a specific direction. Specifically, the axis of the liquid crystal molecule is generally oriented parallel to electrically conductive films 18 and 20.

When a pressure, P, is applied to the flexible film 24, the flexible film 24 and the electrically conductive film 20 will flex towards the electrically conductive film 18 in the location of the liquid crystal droplets 10 or cells 14 at the sight where the pressure is applied. The relative difference in height between the top of the liquid crystal droplets 10 or liquid crystals in cells 14 and the surrounding matrix 12 or grid 16 allows the electrically conductive film 20 to flex inward under the influence of an applied pressure. In addition, when the pressure, P, is a low or vacuum pressure, the electrically conductive film 20 to flexes away from the bottom electrically conductive film 18.

As can be seen specifically from FIG. 3b, the pressure, P, causes a change in field strength between electrically conductive films 18 and 20. Specifically, the field strength at the sight where pressure is applied, E'(P), is greater than the field strength, E, that exists uniformly across the area covered by the pressure sensor when no pressure is applied to the pressure sensor or that exists at locations in the area covered by the pressure sensor where pressure is not applied (e.g., pressure from a pressure source such as a gas jet or the like may impact one area of a pressure sensor that is located on the wing of an aircraft or like structure more than other areas). The change in electric field strength, E'(P), will cause the liquid crystals in the droplets 10 or cells 14 to assume a second state of orientation of the molecular long axes. The second state of orientation is rotated with respect to the other by an angle which is a function of the electric field strength which depends on the applied pressure.

With reference to FIG. 3a, polarized light through polarizer $P_1$ is transmitted through the pressure sensor to reach the other polarizer, which is the analyzer A, whose plane of polarization is set 90° to that of the first. This arrangement of polarizers is also called crosspolarization. In such a situation, light transmitted through the sensor assembly is stopped by the analyzer to reach the eye or the detector 100. By adjusting the voltage, V, between the electrically conductive films 18 and 20, the liquid crystal in droplets 10 or cells 14 of layer 13 can be set to a first state of orientation wherein polarized light from P will pass through the glass substrate 22, the electrically conductive films 18 and 20, liquid crystal droplets 10 or cells 14, and the transparent, flexible film 24 without a phase change. Hence, no light will be sensed coming out of the analyzer, A, when no pressure is applied to the pressure sensor and the liquid crystals are in the first orientation state.

FIG. 3b shows that the liquid crystal assumes the second orientation state under the influence of an applied pressure which causes the change in the field strength, E'(P), on the crystal. The reorientation of the liquid crystal leads to a change in the phase of polarization of the transmitted light. In this situation, the light transmitted to the analyzer, A, is not 90° out of phase. Since the analyzer, A, is set to stop only the 90° out of phase light, some light will pass through the analyzer, A, resulting in a change in the sensor transparency.

From a qualitative perspective, it can be determined that pressure is being exerted at locations on the pressure sensor where light is seen at the analyzer, A. More intense light would indicate that greater pressure is being exerted.

Because the light detected at analyzer, A, is dependent on the applied pressure, P, the pressure sensor of this invention is extremely fast acting. In particular, in the situation where a pressure source moves across a pressure sensor of this invention and exerts pressure, P, at different locations, the analyzer, A, will simultaneously sense change in light emanating from the locations on the pressure sensor that the pressure source moves across.

The sensor can also be operated in an alternative mode in which the first state is adjusted with respect to the crossed polarizers ($P_1$ and A) such that the transparency of the sensor is maximum in absence of the external pressure and declines when the pressure is applied. In this situation, a decline in transparency of the sensor would indicate that greater pressure is being exerted.

The pressure shown in FIGS. 3a and 3b shows that the polarization of light transmitted through $P_1$ is 90° out of phase with respect to that transmitted through analyzer, A.

Figure 5:
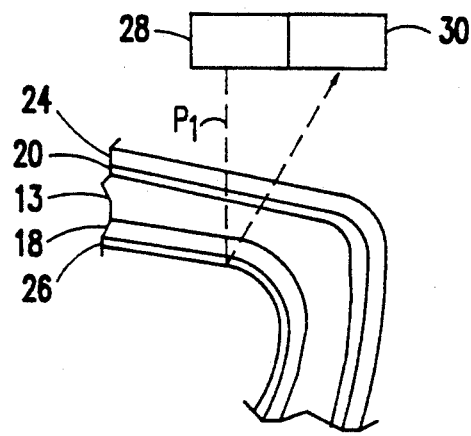
FIG. 5 is a cross-sectional side view of a pressure sensor according to this invention which conforms to the contours of a curved surface.

While FIGS. 1 and 3a–3b show the use of a transparent glass substrate 22 in the pressure sensor, FIG. 5 shows that a reflective coating 26 could underlie the transparent, electrically conductive film 18. In this way, polarized light, through $P_1$, from source 28 would be transmitted through the liquid crystal of layer 13 and reflected to the analyzer 30. As shown in FIGS. 3a and 3b, the polarizer $P_1$ and the analyzer 30 can advantageously be cross polarized such that no light passes through the analyzer 30 when no pressure is applied to the pressure sensor. In FIGS. 3a–b and 5, polarization filters (not shown) could be used for producing the polarized light and detecting it.

A particular advantage of the pressure sensor of the present invention is that it can be fabricated to conform to the contours of a curved object. FIG. 5 particularly shows that a curved object 26 such as a wing of an aircraft, could have a sensor placed thereon. Provided that the distance, d, between the electrically conductive films 18 and 20 remains constant throughout the pressure sensor, the electric field, E, will be the same for the liquid crystals in layer 13 on flat surfaces as well as curved surfaces. Hence, the application of pressure to the pressure sensor will be sensed by the transmitted (if the curved structure is transparent) or reflected light detected at the analyzer 30.

Figure 4:
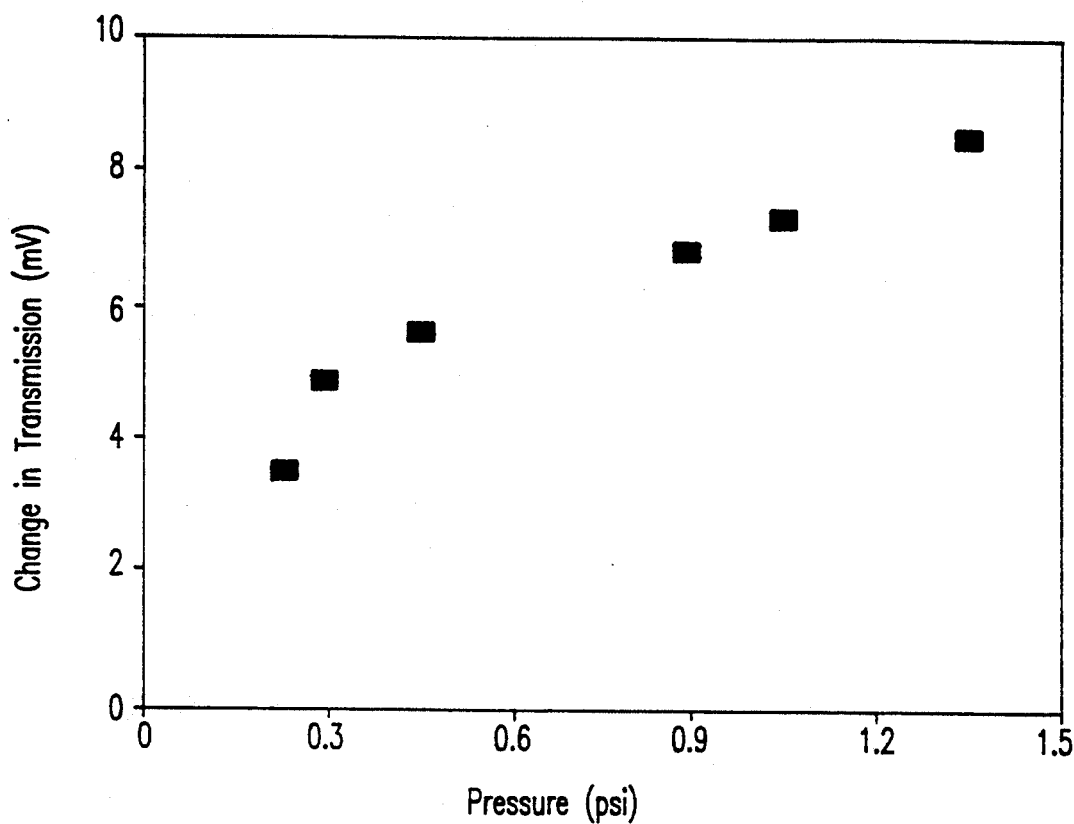
FIG. 4 is a graph showing the change in transmitted light intensity as a function of external pressure for a pressure sensor according to this invention.

FIG. 4 demonstrates that in a cross-polarized light system like that shown in FIGS. 3a and 3b, the transmitted light intensity as a function of the applied external pressures is generally linear. Specifically, in FIGS. 3a–b, a pressure sensing film 13 comprised of a ferroelectric liquid crystal dispersed in a transparent polymer matrix in a "Swiss Cheese" structure configuration was deposited on an ITO coated glass plate 22 (area=1 square inch). Careful microscopic examination of the film 13 topography reveals that the wells in the film 13 are filled with liquid crystal 10 only partially. A transparent ITO coated flexible polyvinylidine fluoride (PVF2) thin (approximately 54 micrometer) sheet 24 was overlayed on the sensor film 13. The sensor assembly of FIG. 3a was placed on a rotating stage of an optical polarizing microscope and was studied in the transmission mode. A bias voltage of 20 volts was applied across the electrodes (e.g., the ITO coated glass plate and the ITO coated PVF2 sheet). The sensor was adjusted in between the crossed polarizers of the microscope to give minimum transmission in absence of applied external pressure. Application of pressure on the flexible PVF2 sheet electrode produces an increase in the transmission of light through the sensor. The intensity of the transmitted light is recorded with a photodetector attached to the microscope. The change in transmission (obtained by subtracting the photodetector output in absence of applied pressure from the output in presence of the pressure) as a function of pressure on the sensor is shown in FIG. 4.

FIG. 4 shows that the transfer function from the pressure input to light intensity output variation is governed directly by modulation of the liquid crystalline molecular long axis orientation. Hence, quantitative measurements of applied pressure can be obtained by deriving a calibration curve or function relating the change in transmission to applied pressure for a pressure sensor, and using the calibration curve or function to determine the applied pressure when the pressure sensor is in service.

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. A pressure sensor, comprising:
   an electrical component having
   (i) first and second, spaced apart, electrically conductive films, at least one of said first and second, spaced apart, electrically conductive films allowing light transmission therethrough, said first electrically conductive film capable of movement under the influence of an applied pressure relative to said second electrically conductive film,
   (ii) a liquid crystal positioned between said first and second, spaced apart, electrically conductive films, and
   (iii) a means for applying a voltage between said first and second, spaced apart, electrically conductive films; and
   an optical component having
   (i) a means for directing polarized light towards said liquid crystal, and
   (ii) a means for detecting polarized light emanating from said liquid crystal.

2. The pressure sensor of claim 1 wherein said means for detecting polarized light detects polarized light which is ninety degrees out of phase with polarized light directed towards said liquid crystal by said means for directing.

3. The pressure sensor of claim 1 wherein said means for detecting polarized light detects polarized light which is in phase with polarized light directed towards said liquid crystal by said means for directing.

4. The pressure sensor of claim 1 wherein said means for directing polarized light is arranged to direct polarized light through a first side of said electrical component and said means for detecting polarized light is arranged to receive transmitted light from a second side of said electrical component.

5. The pressure sensor of claim 1 wherein said means for directing polarized light is arranged to direct polarized light through a first side of said electrical component and said means for detecting polarized light is arranged to receive reflected light reflected from inside said electrical component out said first side of said electrical component.

6. The pressure sensor of claim 1 wherein said liquid crystal is dispersed as droplets in a polymer matrix which forms a layer between said first and second, spaced apart, electrically conductive films.

7. The pressure sensor of claim 1 wherein said liquid crystal is dispersed within cells of a grid which forms a layer between said first and second, spaced apart, electrically conductive films.

8. The pressure sensor of claim 1 wherein said electrical component has a planar shape.

9. The pressure sensor of claim 1 wherein said electrical component has a non-planar shape.

10. The pressure sensor of claim 1 further comprising a flexible, transparent, film connected to said first electrically conductive film.

11. The pressure sensor of claim 1 further comprising a transparent substrate connected to said second electrically conductive film.

12. The pressure sensor of claim 1 further comprising a reflective coating connected to said second electrically conductive film.

13. The pressure sensor of claim 1 further comprising a means for correlating a detected light intensity from said means for detecting with pressure.

14. The pressure sensor of claim 1 wherein said first and second, spaced apart, electrically conductive films are the same material.

15. The pressure sensor of claim 14 wherein said first and second, spaced apart, electrically conductive films are indium-tin-oxide.

* * * * *